US011003799B2

(12) United States Patent
Gireesan et al.

(10) Patent No.: US 11,003,799 B2
(45) Date of Patent: May 11, 2021

(54) SYSTEM AND METHOD FOR INTEGRITY ASSURANCE IN A VIRTUAL ENVIRONMENT

(71) Applicant: Marlabs Innovations Private Limited, Bangalore (IN)

(72) Inventors: Sreejith Gireesan, Edison, NJ (US); Balasubramanian K Pethayapera, Edison, NJ (US); Bimal Mankara Balan, Ernakulam (IN)

(73) Assignee: Marlabs Innovations Private Limited, Bangalore (IN)

( * ) Notice: Subject to any disclaimer, the term of this patent is extended or adjusted under 35 U.S.C. 154(b) by 263 days.

(21) Appl. No.: 15/958,832

(22) Filed: Apr. 20, 2018

(65) Prior Publication Data

US 2019/0325162 A1 Oct. 24, 2019

(51) Int. Cl.
*G06F 21/64* (2013.01)
*H04L 9/06* (2006.01)
*G06F 21/60* (2013.01)
*H04L 9/08* (2006.01)

(52) U.S. Cl.
CPC ............ *G06F 21/64* (2013.01); *G06F 21/602* (2013.01); *H04L 9/0637* (2013.01); *H04L 9/0861* (2013.01)

(58) Field of Classification Search
CPC ................................ G06F 21/64; H04L 9/0637
See application file for complete search history.

(56) References Cited

U.S. PATENT DOCUMENTS

| | | | | |
|---|---|---|---|---|
| 5,208,853 A * | 5/1993 | Armbruster | ......... | G06F 21/6209 380/46 |
| 6,144,739 A * | 11/2000 | Witt | ........................ | G06F 21/64 380/2 |
| 10,581,613 B2 * | 3/2020 | Ford | ...................... | G06Q 20/29 |
| 2002/0019945 A1 | 2/2002 | Houston et al. | | |
| 2006/0294206 A1 * | 12/2006 | Graveline | ............. | G06F 21/606 709/219 |
| 2018/0157825 A1 * | 6/2018 | Eksten | .................. | H04L 9/3239 |
| 2018/0158054 A1 * | 6/2018 | Ardashev | ............... | G06Q 10/10 |
| 2019/0004789 A1 * | 1/2019 | Mills | ........................ | G06F 8/36 |

(Continued)

FOREIGN PATENT DOCUMENTS

| | | |
|---|---|---|
| KR | 20060121829 | 12/2006 |
| WO | 2014116264 A1 | 7/2014 |
| WO | 2017127243 A1 | 7/2017 |

*Primary Examiner* — Jason Chiang
(74) *Attorney, Agent, or Firm* — Jason C. Cameron

(57) ABSTRACT

System and method for integrity assurance in a virtual environment are provided. The system includes a memory. The memory is configured to receive and store one or more artifacts. The system also includes a processing subsystem operatively coupled to the memory. The processing subsystem is configured to create one or more binary files for a stored one or more artifacts. The processing subsystem is also configured to incorporate the one or more artifacts into a blockchain platform. The processing subsystem is further configured to request the blockchain platform to trigger a crypto sealing process for the one or more artifacts. The processing subsystem is further configured to copy one or more crypto sealed artifacts to a repository. The processing subsystem is further configured to request the blockchain to trigger a verification process to one or more copied artifacts for integrity assurance.

8 Claims, 5 Drawing Sheets

(56) References Cited

U.S. PATENT DOCUMENTS

2019/0065709 A1\* 2/2019 Salomon ............... H04L 9/3239
2019/0149325 A1\* 5/2019 Garagiola ............. H04L 9/3263
                                                    380/278
2019/0236548 A1\* 8/2019 Singi .................... G07F 19/211

\* cited by examiner

SYSTEM AND METHOD FOR INTEGRITY ASSURANCE IN A VIRTUAL ENVIRONMENT

BACKGROUND

Embodiments of the present disclosure relate to integrity assurance of files, and more particularly to system and method for integrity assurance in a virtual environment.

Files are a set of records kept together which have to be recorded and maintained. In certain situations, a chain of files have to be maintained. Further, in such a condition, the main purpose is to ensure that the chain of files are not invaded or tampered. Hence maintaining the integrity of the files and assuring a safety of the files is a preliminary criterion.

In one approach, one or more files are stored in a storage medium, which has to be transmitted to a target environment. In such systems an access control security system is implemented to restrict an access to the one or more files or any other related resources. Hence the system is protected from being invaded or tampered. However, in such systems, the one or more files must be transmitted in the form of packets. Hence the control access security system is not efficient to protect the packets of files from being contaminated from a third party.

In another approach, the system uses a processor and an authenticator, wherein the processor is used to convert a received data or received files into program files. Further, the authenticator is configured to selectively sign the program files using a key which is associated with one or more devices for which the program file is assigned or designed. However, in such systems, verification of the encrypted file is not being done. Hence, the system does not ensure if the received data or the received files are same as original data or original files.

Hence, there is a need for an improved system and method for integrity assurance in a virtual environment to address the aforementioned issues.

BRIEF DESCRIPTION

In accordance with one embodiment of the disclosure, a system for integrity assurance in a virtual environment is provided. The system includes a memory. The memory is configured to receive and store one or more artifacts. The system also includes a processing subsystem operatively coupled to the memory. The processing subsystem is configured to create one or more binary files for a stored one or more artifacts. The processing subsystem is also configured to incorporate the one or more artifacts into a blockchain platform. The processing subsystem is further configured to request the blockchain platform to trigger a crypto sealing process for the one or more artifacts. The processing subsystem is further configured to copy one or more crypto sealed artifacts to a repository. The processing subsystem is further configured to request the blockchain to trigger a verification process to one or more copied artifacts for integrity assurance.

In accordance with another embodiment of the disclosure, a method for integrity assurance in a virtual environment is provided. The method includes receiving and storing one or more artifacts. The method also includes creating one or more binary files for the one or more artifacts. The method further includes incorporating the one or more artifacts into a blockchain platform. The method further includes requesting the blockchain platform to trigger a crypto sealing process. The method further includes copying one or more crypto sealed artifacts to a repository. The method further includes requesting the blockchain platform to trigger a verification process to one or more copied artifacts for integrity assurance.

BRIEF DESCRIPTION OF THE DRAWINGS

The disclosure will be described and explained with additional specificity and detail with the accompanying figures in which.

Figure 1:
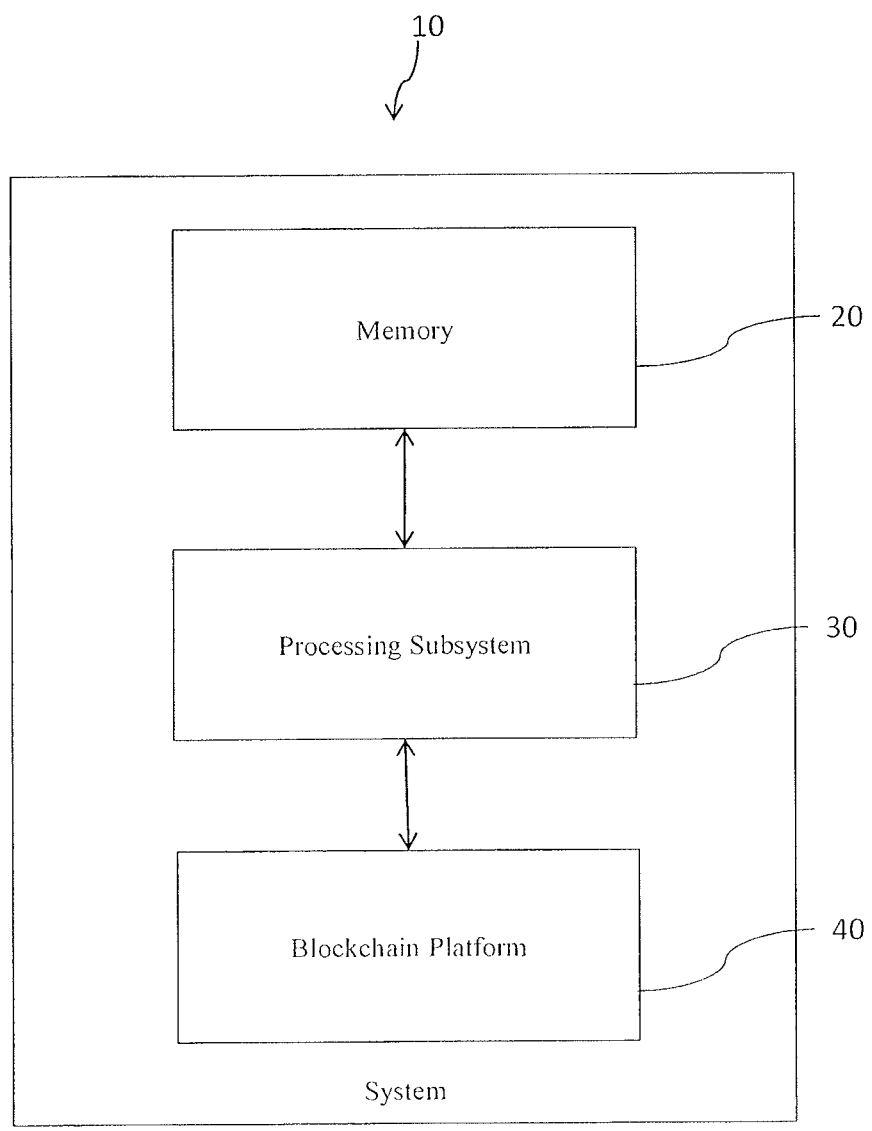
FIG. 1 is a block diagram representing a system for integrity assurance in a virtual environment in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and a method for integrity assurance in a virtual environment. The system includes a memory. The memory is configured to receive and store one or more artifacts. The system also includes a processing subsystem operatively coupled to the memory. The processing subsystem is configured to create one or more binary files for a stored one or more artifacts. The processing subsystem is also configured to incorporate the one or more artifacts into a blockchain platform. The processing subsystem is further configured to request the blockchain platform to trigger a crypto sealing process for the one or more artifacts. The processing subsystem is further configured to copy one or more crypto sealed artifacts to a repository. The processing subsystem is further configured to request the blockchain to trigger a verification process to one or more copied artifacts for integrity assurance.

FIG. 1 is a block diagram representing a system for integrity assurance in a virtual environment in accordance with an embodiment of the present disclosure. The system (10) includes a memory (20). The memory (20) is configured to receive and store one or more artifacts. In one embodiment, the system (10) may include a volatile memory such as a cache memory or a random access memory (RAM). In another embodiment, the memory (10) may be a non-volatile memory such as a read only memory (ROM), a flash memory, and a computer storage memory such as a hard disk drive or an optical disk. In yet another embodiment, the memory (10) may be included in a remote memory storage such as a cloud storage. In one specific environment, the system (10) may be a development and operation (DevOps) workflow.

As used herein, artifacts are a type of tangible by-products which are produced during a development of a system model. In one embodiment, the one or more artifacts may describe a function, a use case, development of a process or an architecture of the system model. In another embodiment, the one or more artifacts may be one or more computer files or one or more by-products.

In one specific embodiment, the memory (20) may receive the one or more artifacts from a development unit. In such embodiment, the development unit may be operatively coupled to the memory (20). In one embodiment, the development unit may be configured to develop the one or more artifacts based on a requirement. Further, the development unit may also be configured to store the one or more developed artifacts in a version control system. In one embodiment, the development unit may be an integrated development environment. In such embodiment, the integrated development environment may be a microsoft visual studio or an eclipse development environment.

As used herein, the version control system which is also known as a source control system is a type of system to manage one or more changes in the one or more artifacts. In such embodiment, the one or more or more artifacts may be one or more files or one or more documents. In one embodiment, the version control system may be a repository. In such embodiment, the repository may be an artifacts repository. As used herein, the repository is an on-disk data structure configured to store a plurality of metadata for the one or more artifacts. In one embodiment, the code repository may be a git repository, a team foundation server repository, a subversion repository or any similar repository.

Further, the development unit may be configured to transmit one or more stored artifacts to the memory (20). In one embodiment, the development unit may transmit the one or more artifacts through a wired communication or through a wireless communication.

The system (10) also includes a processing subsystem (30) operatively coupled to the memory (20). The processing subsystem (30) is configured to create one or more binary files for a stored one or more artifacts. In one embodiment, the processing subsystem (30) may create the one or more binary files through compilation of the one or more artifacts which may be stored in the version control system. In such embodiment, the compilation may be done through a build tool. In one embodiment, the build tool may be a Jenkins platform or a visual studio team foundation server platform.

The processing subsystem (30) is also configured to incorporate the one or more artifacts into a blockchain platform (40). As used herein, the blockchain platform is a continuously growing list of records which is known as blocks. Further, the blocks are linked to each other and are highly secured using cryptography. Further, cryptography is a type of study of techniques for a secure communication in the presence of a third party such as adversaries. In one specific embodiment, the blockchain platform (40) may be a virtual environment.

The processing subsystem (30) is further configured to request the blockchain platform (40) to trigger a crypto sealing process for the one or more artifacts. In one embodiment, the processing subsystem (30) may send a request to the blockchain platform (40), wherein the request may be to trigger the processing subsystem (40) to start a crypto sealing process for the one or more artifacts. Further, the blockchain platform (40) may send a command to the processing subsystem (30) to crypto seal the one or more artifacts.

As used herein, crypto seal is a stream cipher in cryptography which is optimised for machines which have a minimum of 32-bit word size and a large RAM space. Further, the crypto seal is a pseudorandom function family and hence can generate an arbitrary portion of keystream without a need to start the process from the beginning. Hence crypto sealing is used in applications like encryption of hard drives or any other encryption of files.

In one embodiment, the crypto sealing may be used to encrypt the one or more artifacts. In such embodiment, the crypto sealing of the one or more artifacts may be done with a help of an encryption cryptographic key. In one embodiment, the encryption cryptographic key may be a public cryptographic key or a private cryptographic key. In another embodiment, the blockchain platform (40) may generate a decryption cryptographic key which may be used to verify one or more sealed artifacts during decryption. As used herein, a cryptographic key is a piece of information which is used to determine an output of a cryptographic function. More specifically, cryptographic key is a string of bits which are used by a cryptographic function to transfer a string of plain text into a string of cipher text or vice versa.

The processing subsystem (30) is further configured to copy one or more crypto sealed artifacts to a repository. In one embodiment, the one or more artifacts which may be sealed with the help of the blockchain platform (40) may be stored in the repository. In such embodiment, the encryption cryptographic key for the one or more sealed artifacts may also be stored in the blockchain platform (40).

In another embodiment, the repository may be an artifacts repository. In such embodiment, the artifacts repository may be a nexus repository or an artifactory repository. In such embodiment, the artifacts repository may be a repository manager. As used herein, the repository manager is a managing tool which serves the purpose of configurable proxies between an organization and an external reciprocity. Further, the repository manager also provides deployment for the one or more developed artifacts.

The processing subsystem (30) is further configured to request the blockchain platform (40) to trigger a verification process to one or more copied artifacts for integrity assurance. In one embodiment, the processing subsystem (30) may deploy the one or more sealed artifacts to at least one server environment. In such embodiment, the processing subsystem (30) may send a request to the blockchain platform (40), wherein the request may be to trigger the processing subsystem (30) to start a verification process for the one or more sealed artifacts before the one or more sealed artifacts may be deployed. In such embodiment, the blockchain platform (40) may send a command to the processing subsystem (30) to start the verification process for the one or more sealed artifacts.

Further, based on the command from the blockchain platform (40), the processing subsystem (30) may verify the one or more sealed artifacts based on the decryption cryptographic key which may be produced and stored in the blockchain platform (40) during the crypto sealing process. Further, during the verification process, if the one or more sealed artifacts are found similar to the original received one or more artifacts, then the processing subsystem (30) may further continue for deployment. Also, if the one or more sealed artifacts do not match the original received one or more artifacts, then the processing subsystem (30) may reject from deploying the one or more artifacts.

In one specific embodiment, one or more verified artifacts may be transmitted to at least one production unit. In such embodiment, the production unit may be a development platform, a quality assurance platform, an operation platform or a production platform.

In one embodiment, the one or more sealed artifacts which may be stored in the repository may be transmitted to a release management tool, wherein the release management tool may be operatively coupled to the repository. The release management tool may be configured to copy the one or more sealed artifacts from the repository and may deploy the one or more sealed artifacts to at least one server environment.

In such embodiment, the at least one server environment may be a development environment, a quality assessment environment or a production environment. As used herein, the release management tool is a tool which is used to manage, plan, schedule and control the build tool through one or more stages. In one embodiment, the release management tool which may be used for deploying the one or more sealed artifacts. In such embodiment, the release management tool may be a teamcity tool, an octopus tool, the visual studio team foundation server platform or a Jenkins tool.

Figure 2:
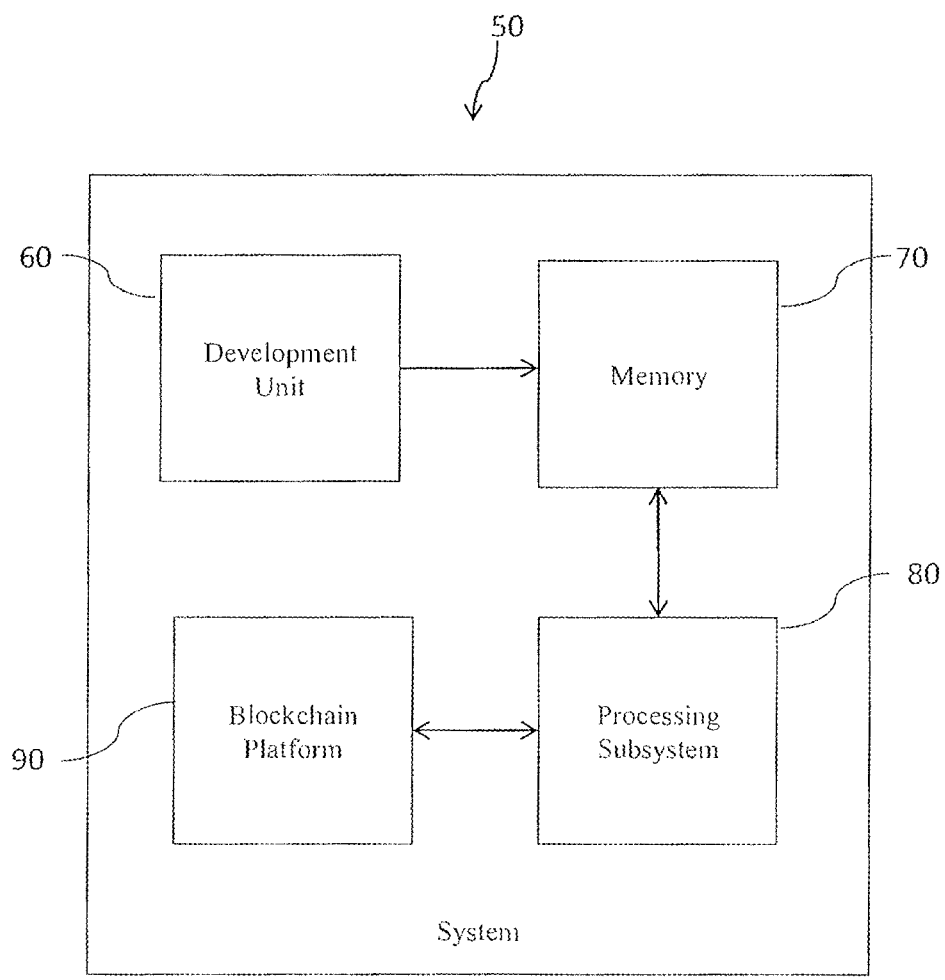
FIG. 2 is a block diagram of an exemplary embodiment of a system for integrity assurance in a virtual environment of FIG. 1 in accordance with an embodiment of the present disclosure.

FIG. 2 is a block diagram representing an exemplary embodiment of a system for integrity assurance in a virtual environment of FIG. 1 in accordance with an embodiment of the present disclosure. The system (50) includes a development unit (60) which is configured to develop one or more artifacts. The development unit (60) is also configured to store one or more developed artifacts. In one embodiment, the one or more developed artifacts may be stored in a version control system. In another embodiment, the one or more developed artifacts may be built using a build tool. In such embodiment, the one or more artifacts are built to compile the one or more developed artifacts.

The system (50) also includes a memory (70) operatively coupled to the development unit (60). The memory (70) is substantially similar to a memory (20) of FIG. 1. In one embodiment, the memory may be a RAM, ROM, cache memory, a flash memory or a computer storage device.

The system (50) further includes a processing subsystem (80) operatively coupled to the memory (70). The processing subsystem (80) is substantially similar to a processing subsystem (30) of FIG. 1. The processing subsystem (80) is configured to create one or more binary files for one or more stored artifacts. In one embodiment, the one or more artifacts may be built using the build tool to create the one or more binary files for the one or more stored artifacts. In such embodiment, the processing subsystem (80) may include the build tool. Further, the memory (70) is configured to store the one or more built artifacts.

The system (50) further includes a blockchain platform (90) which is operatively coupled to the processing subsystem (80). The blockchain platform (90) is substantially similar to a blockchain platform (40) of FIG. 1. In one embodiment, the one or more built artifacts may be incorporated into the blockchain platform (90).

Further, the blockchain platform (80) is configured to create a crypto seal to the one or more built artifacts. The processing subsystem (80) may send a request to the blockchain platform (90) to start a crypto sealing process. In such embodiment, based on the request sent by the processing subsystem (80), the blockchain platform (90) crypto seals the one or more built artifacts using a cryptographic key. Further, one or more crypto sealed artifacts and the cryptographic key which may be used to crypto seal the one or more artifacts may be integrated with the blockchain platform (90). In one embodiment, the one or more built artifacts may be copied to a repository. In one embodiment, the repository may be an artifacts repository.

The processing subsystem (80) may also be configured to verify the one or more built artifacts. In one embodiment, the processing subsystem (80) may send a request to the blockchain platform (90) to verify the one or more built artifacts to assure the integrity of the one or more built artifacts. In such embodiment, the blockchain platform (90) may send a command to the processing subsystem (80) to verify the one or more built artifacts based on the request sent by the processing subsystem (80). Further the blockchain platform (90) uses a decryption cryptographic key to verify the one or more built artifacts.

Further, if the one or more built artifacts gives a positive verification, the one or more built artifacts may be used further. If the one or more built artifacts render a negative result for the verification, the one or more artifacts are denied for further usage. In one embodiment, the processing subsystem (80) may verify the one or more built artifacts based on the decryption cryptographic key generated during the crypto sealing process. In such embodiment, the decryption cryptographic key may also be stored in the blockchain platform (90). In another embodiment, during verification of the one or more artifacts, a decryption cryptographic key may be used by the processing subsystem (80) to verify the one or more built artifacts. In such embodiment, the encryption cryptographic key used for crypto sealing and also the decryption cryptographic key may be stored in the blockchain platform (90).

In yet another embodiment, the one or more verified artifacts may be deployed to at least one production system. In yet another embodiment, the one or more verified artifacts may be deployed to one or more server environment.

Figure 3:
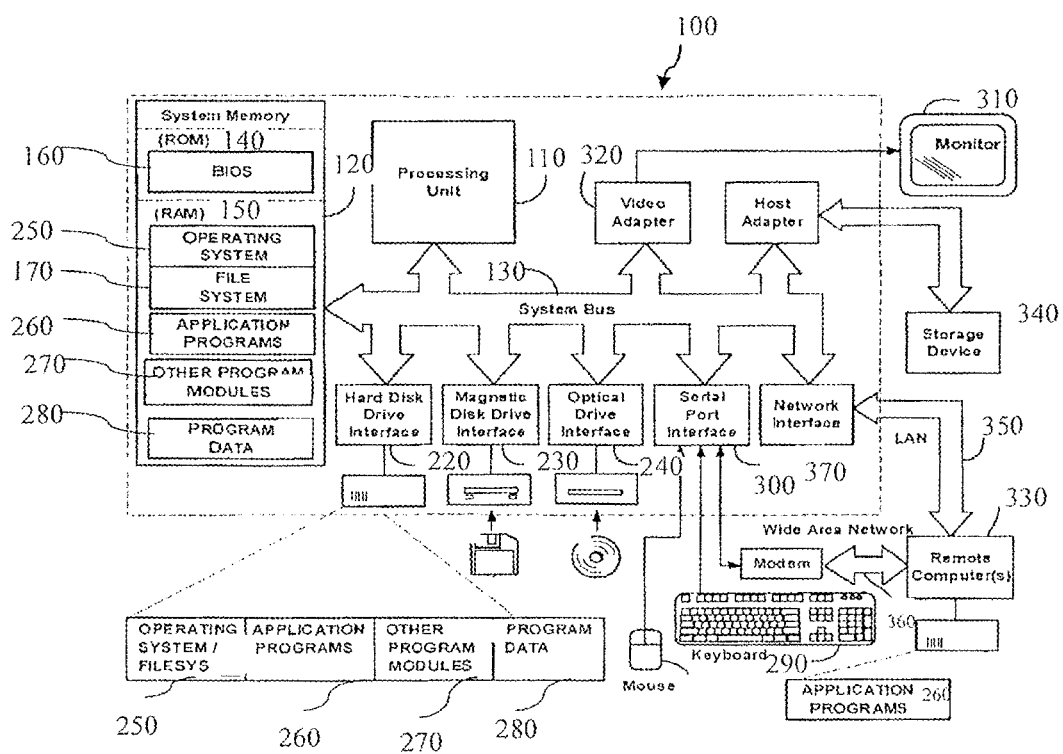
FIG. 3 is a block diagram of a computer or a server in accordance with an embodiment of the present disclosure.

FIG. 3 is a block diagram of a computer or a server in accordance with an embodiment of the present disclosure. The exemplary system (100) for integrity assurance in a virtual environment (10) includes a general-purpose computing device in the form of a computer (100) or a server or the like. The computer (100) includes a processing unit (110) substantially similar to the processing subsystem (30) of FIG. 1, and configured to assure the integrity of one or more artifacts using a blockchain platform (40), a system memory (120) substantially similar to the memory (20) of FIG. 1, and configured to store one or more received artifacts. The computer (100) also includes a system bus (130) that couples various system components including the system memory (100) to the processing unit (110).

The system bus (130) may be any of several types of bus structures including a memory bus or memory controller, a peripheral bus, and a local bus using any of a variety of bus architectures. The system memory (120) includes read-only memory (ROM) (140) and random access memory (RAM) (150). A basic input/output system (BIOS) (160), containing the basic routines that help transfer information between elements within the computer (100), such as during start-up, is stored in ROM (140).

The computer (100) may further include a hard disk drive for reading from and writing to a hard disk, not shown, a magnetic disk drive for reading from or writing to a removable magnetic disk, and an optical disk drive for reading from or writing to a removable optical disk such as a CD-ROM, DVD-ROM or other optical media.

The hard disk drive, magnetic disk drive, and optical disk drive 30 are connected to the system bus by a hard disk drive interface (220), a magnetic disk drive interface (230), and an optical drive interface (240), respectively. The drives and their associated computer-readable media provide non-volatile storage of computer readable instructions, data structures, program modules and other data for the computer (100) to the various results generated from the data processing unit (110).

Although the exemplary environment described herein employs a hard disk, a removable magnetic disk and a removable optical disk, it should be appreciated by those skilled in the art that other types of computer readable median that can store data that is accessible by a computer, Such as magnetic cassettes, flash memory cards, digital video disks, Bernoulli cartridges, random access memories (RAMS), read-only memories (ROMs) and the like may also be used in the exemplary operating environment.

A number of program modules may be stored on the hard disk, magnetic disk, optical disk, ROM (140) or RAM (150), including an operating system (250). The computer (100) includes a file system (170) associated with or included within the operating system (250), one or more application programs (260), other program modules (270) and program data (280). A user may enter commands and information into the computer (100) through input devices (290) such as a keyboard and pointing device. Other input devices (not shown) may include a microphone, joystick, game pad, Satellite dish, Scanner or the like.

These and other input devices are often connected to the data processing unit (110) through a serial port interface (300) that is coupled to the system bus, but may be connected by other interfaces, such as a parallel port, game port or universal serial bus (USB). A monitor (310) or other type of display device is also connected to the system bus (130) via an interface. Such as a video adapter (320). In addition to the monitor (310), personal computers typically include other peripheral output devices (not shown), such as speakers and printers.

The computer (100) may operate in a networked environment using logical connections to one or more remote computers (330). The one or more remote computer (330) may be another computer, a server, a router, a network PC, a peer device or other common network node, and typically includes many or all of the elements described above relative to the computer (100), although only a memory storage device (340) has been illustrated. The logical connections include a local area network (LAN) (350) and a wide area network (WAN) (360). Such networking environments are common place in offices, enterprise-wide computer networks, Intranets and the Internet.

When used in a LAN (350) networking environment, the computer (100) is connected to the local network (350) through a network interface or adapter (370). When used in a WAN (360) networking environment, the computer (100) typically includes a modem (380) or other means for establishing communications over the wide area network (360), such as the Internet.

The modem (380), which may be internal or external, is connected to the system bus (130) via the serial port interface (300). In a networked environment, program modules depicted relative to the computer (100), or portions thereof, may be stored in the remote memory storage device. It will be appreciated that the network connections shown are exemplary and other means of establishing a communications link between the computers may be used.

Figure 4:
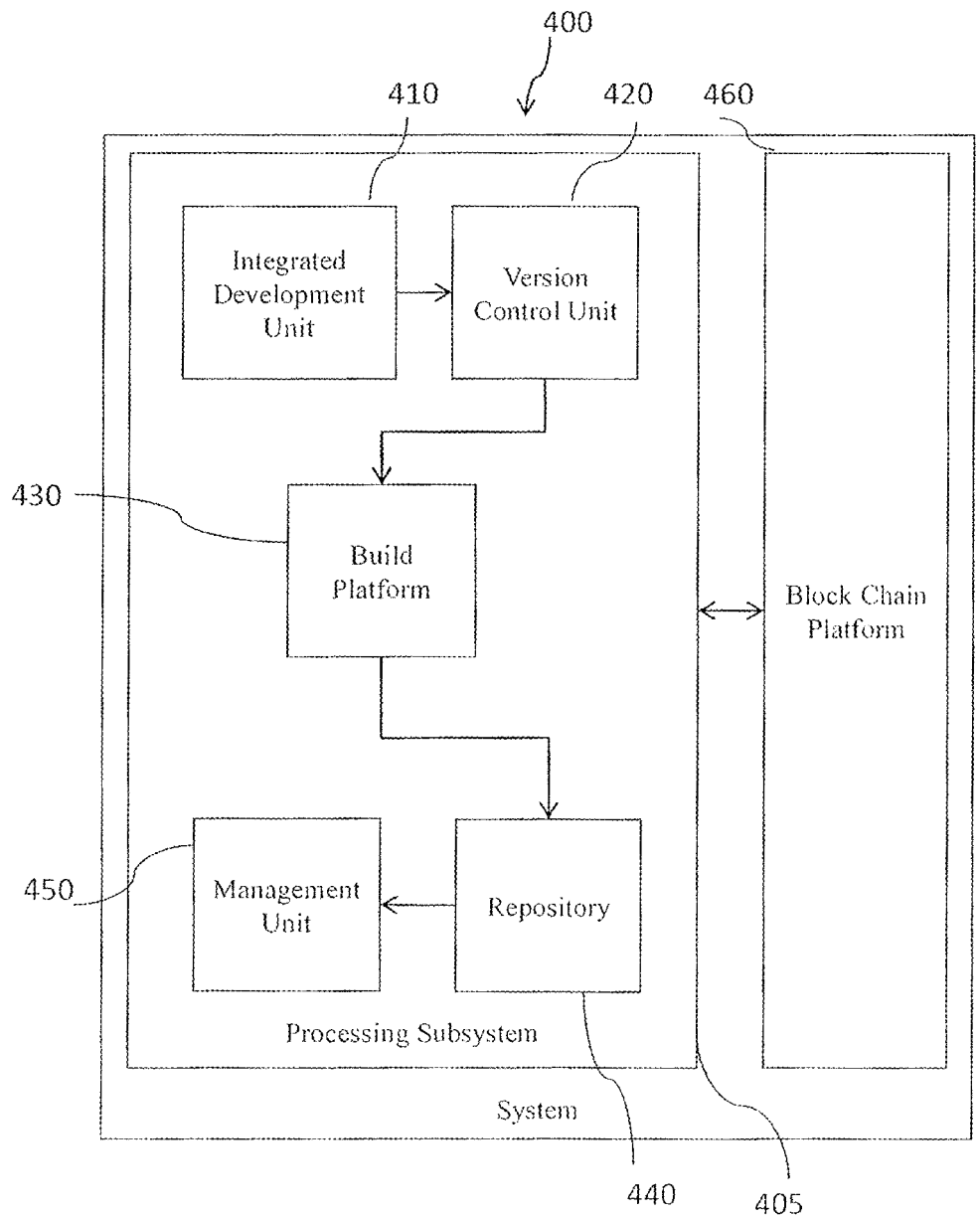
FIG. 4 is a block diagram of another exemplary embodiment of a system for integrity assurance in a virtual environment of FIG. 1 in accordance with an embodiment of the present disclosure.

FIG. 4 is a block diagram representing another exemplary embodiment of a system for integrity assurance in a virtual environment of FIG. 1 in accordance with an embodiment of the present disclosure. The system (400) includes a processing subsystem (405) which is substantially similar to a processing subsystem (30) of FIG. 1.

The processing subsystem (405) includes an integrated development unit (410) configured to develop one or more artifacts. The integrated development unit (410) further stores one or more artifacts in a version control unit (420), wherein the version control unit (420) is operatively coupled to the integrated development unit (410). In one embodiment, the version control unit (410) may be a repository. In such embodiment, the repository may be a Git repository, a team foundation server repository or a subversion repository.

Further, the one or more developed artifacts are built on a build platform (430), wherein the build platform (430) is operatively coupled to the version control unit (420). In one embodiment, the built platform (430) may be a Jenkins or a visual studio team service. Further, the build platform (430) gets the one or more artifacts stored in the version control unit (420) and compiles the one or more artifacts to build one or more binary files for the one or more artifacts.

The system (400) also includes a blockchain platform (460) operatively coupled to the processing subsystem (405). The blockchain platform (460) is substantially similar to a blockchain platform (40) of FIG. 1. Further, one or more built artifacts are transmitted and stored in the blockchain platform (400). Further, the processing subsystem (405)

sends a request to the blockchain platform (460) to trigger or enable a crypto sealing process to encrypt the one or more built artifacts.

Based on the request of the processing subsystem (405), the blockchain platform (460) sends a command to the processing subsystem (405) to enable a crypto sealing process for the one or more built artifacts. Further, the processing subsystem (405) seals the one or more built artifacts using crypto sealing process. Further, the processing subsystem (405) uses an encryption cryptographic key to encrypt or seal the one or more built artifacts.

Further, one or more crypto sealed artifacts and the encryption cryptographic key are stored or integrated into the blockchain platform (460). Also, the processing subsystem (405) produces a decryption cryptographic key for decrypting the one or more crypto sealed artifacts in the further usage. The decryption cryptographic key generated is also stored in the blockchain platform (460).

Further, the one or more crypto sealed artifacts are zipped and are copied to a repository (440). In one embodiment, the one or more crypto sealed artifacts may be packed and may be copied to a location. In another embodiment, the repository (440) may be an artifacts repository. In such embodiments, the artifacts repository may be a nexus repository or an artifactory repository.

The processing subsystem (405) further includes a management unit (450) operatively coupled to the repository (440). The one or more crypto sealed artifacts stored in the repository (440) are further transmitted to the management unit (450). In one embodiment, the management unit (450) may a release management tool. In such embodiment, the release management tool may be a teamcity platform, an octopus platform, a visual studio team service platform or a Jenkins platform. Further, the management unit (450) is configured to deploy the one or more artifacts to the at least one server environment.

Further, to deploy the one or more crypto sealed artifacts, the one or more crypto sealed artifacts have to decrypted and verified for integrity assurance. Further, to decrypt the one or more crypto sealed artifacts; the management unit (450) of the processing subsystem (405) sends a request to the blockchain platform (460) to trigger or enable a verification process to check the integrity of the one or more crypto sealed artifacts. Further, based on the request of the processing subsystem (405), the blockchain platform (460) verifies the one or more crypto sealed artifacts by decrypting the one or more crypto sealed artifacts.

Further, to decrypt the one or more crypto sealed artifacts; the decrypting cryptographic key stored in the blockchain platform (460) is used. After decrypting the one or more crypto sealed artifacts, one or more decrypted artifacts are verified with the one or more built artifacts. Further, if the one or more decrypted artifacts appear to match with the one or more built artifacts, the processing subsystem (405) transfers the one or more decrypted artifacts to the at least one server environment for further deployment of the one or more built artifacts. If the one or more decrypted artifacts do not match with the one or more built artifacts, the processing subsystem (405) retrieves the deployment of the one or more decrypted artifacts. In one embodiment, the at least one server environment may be a development platform, a quality assessment platform or a production platform.

Figure 5:
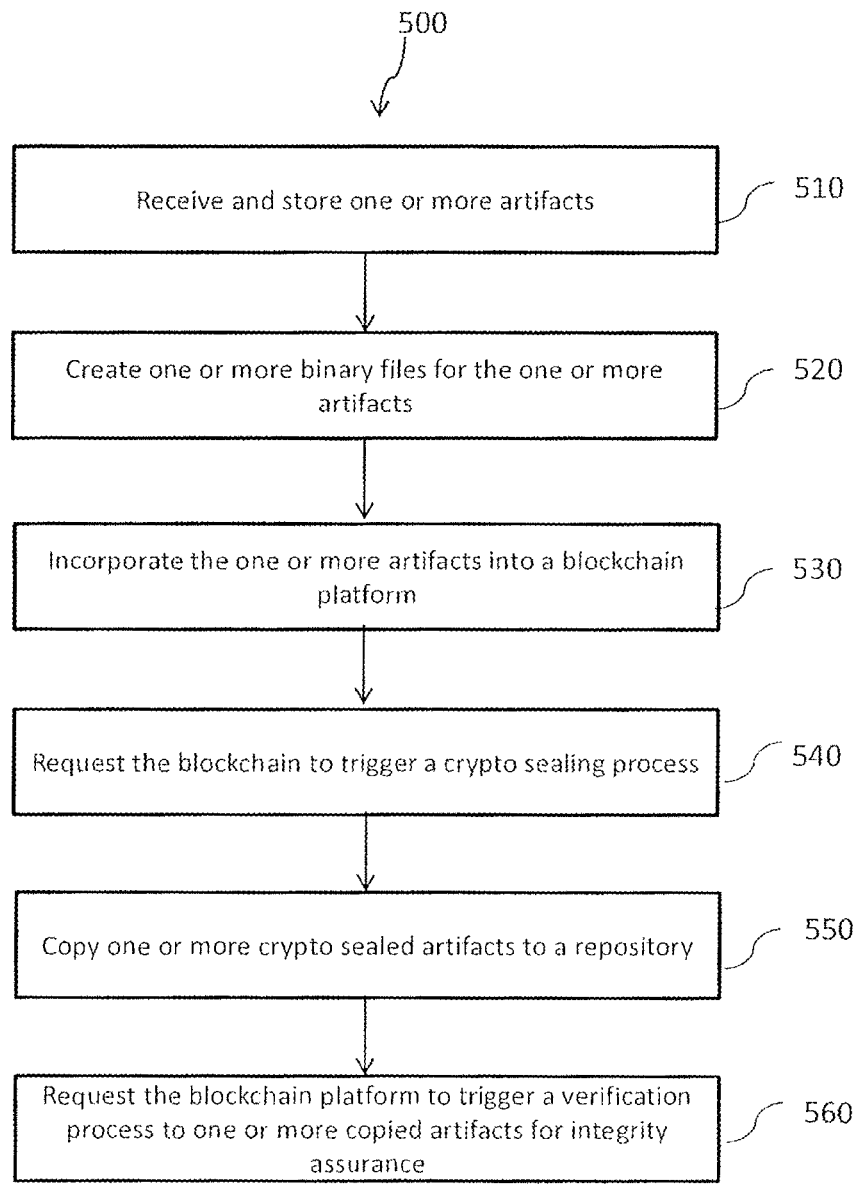
FIG. 5 is a process flow for integrity assurance in a virtual environment in accordance with an embodiment of the present disclosure.

FIG. 5 is a process flow representing integrity assurance in a virtual environment in accordance with an embodiment of the present disclosure. The method (500) for integrity assurance in a virtual platform includes receiving and storing one or more artifacts (510).

In one embodiment, receiving and storing one or more artifacts (510) may include developing the one or more artifacts through an integrated development environment. In such embodiment, the integrated development environment may be a microsoft virtual studio or an eclipse development environment. Receiving and storing one or more artifacts (510) may also include storing one or more developed artifacts in a version control unit.

Receiving and storing one or more artifacts (510) may further include transmitting one or more stored artifacts. In such embodiment, the one or more stored artifacts may be transmitted to a build platform.

The method (500) also includes creating one or more binary files for the one or more artifacts (520). In one embodiment, the one or more artifacts which may be transmitted by the version control unit may be received by the build platform to create one or more binary files for the one or more artifacts.

The method (500) further includes incorporating the one or more artifacts into a blockchain (530). In one embodiment, the one or more built artifacts may be stored in the blockchain platform to ensure the integrity of the one or more built artifacts. In one embodiment, the blockchain platform may be a virtual environment which may be accessed through a computer device.

The method (500) further includes requesting the blockchain to trigger a crypto sealing process (540). In one embodiment, requesting the blockchain to trigger a crypto sealing process may include sending a request to the blockchain platform to seal the one or more built artifacts to ensure the integrity of the one or more built artifacts are maintained. In such embodiment, the blockchain platform may seal the one or more artifacts through crypto sealing process.

In another embodiment, the blockchain platform may enable an encryption cryptographic key to crypto seal the one or more built artifacts. In yet another embodiment, the one or more crypto sealed artifacts along with the encryption cryptographic key may be stored in the blockchain platform.

The method (500) further includes copying one or more crypto sealed artifacts to a repository (550). In one embodiment, the repository may be an artifacts repository. In such embodiment, the artifacts repository may be a nexus repository or an artifactory repository.

The method (500) further includes requesting the blockchain to trigger a verification process to one or more copied artifacts for integrity assurance (560). In one embodiment, requesting the blockchain to trigger a verification process to one or more copied artifacts for integrity assurance may include generating a decryption cryptographic key to verify one or more crypto sealed artifacts. In such embodiment, the one or more crypto sealed artifacts are decrypted using the generated decryption cryptographic key to verify the one or more crypto sealed artifacts received by the repository.

In one embodiment, the generated decryption cryptographic key may be stored in the blockchain platform. Further, if the one or more decrypted artifacts match the one or more built artifacts, the one or more decrypted artifacts may be transmitted for further deployment. In another embodiment, if the one or more decrypted artifacts do not match the one or more built artifacts, the one or more decrypted artifacts may be retrieved from being transmitted for further deployment.

In one embodiment, the deployment of the one or more decrypted artifacts may be done through a release management tool or through a release deployment tool. In such embodiment, the release management tool may be a teamcity platform, an octopus platform, a visual studio team service platform or a Jenkins platform. In such embodiment, the deployment of the one or more decrypted artifacts may be deployed to at least one server environment. In such embodiment, the server environment may be a development platform, a quality assessment platform or a production platform.

In one specific embodiment, the method for integrity assurance in a virtual environment may be implemented on a hyperledger platform.

Various embodiments of the present disclosure enable the system to secure and protect the one or more artifacts from being contaminated from a third party. Further, the system enables a user to trust the system for integrity assurance.

Since the system uses blockchain platform, the system becomes transparent in the continuous deployment workflow. Further, the system is more efficient and user friendly. The integrity of the one or more artifacts is well maintained.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A system for integrity assurance in a virtual environment comprising:
   a memory configured to receive and store one or more artifacts;
   a processing subsystem operatively coupled to the memory, and configured to:
   create one or more binary files for one or more stored artifacts;
   send a request to the blockchain platform to trigger a crypto sealing process for the one or more artifacts;
   receive a command from the block chain platform to start a crypto sealing process for the one or more artifacts;
   seal the one or more artifacts using an encryption cryptographic key upon starting the crypto sealing process, wherein the encryption cryptographic key is generated by the blockchain platform and stored in the blockchain platform;
   store one or more crypto sealed artifacts, sealed based on the command from the blockchain platform, to a repository;
   request the blockchain platform to trigger a verification process of one or more copied artifacts for integrity assurance;
   receive a command from the blockchain platform to start the verification process for the one or more sealed artifacts;
   receive a decryption cryptographic key from the blockchain platform to verify the one or more crypto sealed artifacts, wherein the decryption cryptographic key is generated by the blockchain platform and stored in the blockchain platform; and
   verify the one or more crypto sealed artifacts based on the decryption cryptographic key received from the blockchain platform.

2. The system as claimed in claim 1, wherein the one or more artifacts comprises one or more computer files or one or more by-products.

3. The system as claimed in claim 1, further comprises a development unit operatively coupled to the memory, and configured to:
   develop the one or more artifacts;
   store one or more developed artifacts in a version control system; and
   transmit one or more stored artifacts to the memory.

4. The system as claimed in claim 1, further the processing subsystem is configured to deploy one or more verified artifacts to a production unit.

5. The system as claimed in claim 4, wherein the production unit comprises a development platform, a quality assurance platform, an operation platform or a production platform.

6. A method for integrity assurance in a virtual environment comprising:
   receiving and storing, by a memory, one or more artifacts;
   creating, by a processing subsystem, one or more binary files for one or more stored artifacts;
   sending a request, by the processing subsystem, to the blockchain platform to trigger a crypto sealing process for the one or more artifacts;
   sending a command, by the blockchain platform, to the processing subsystem to trigger a crypto sealing process for the one or more artifacts based on the request by the processing subsystem;
   sealing, by the processing subsystem, the one or more artifacts using an encryption cryptographic key upon triggering the crypto sealing process, wherein the encryption cryptographic key is generated by the blockchain platform and stored in the blockchain platform;
   storing, by the processing subsystem, one or more crypto sealed artifacts, to a repository;
   requesting, by the processing subsystem, the blockchain platform to trigger a verification process of one or more copied artifacts for integrity assurance;
   sending a command, by the blockchain platform, to the processing subsystem to start the verification process for the one or more sealed artifacts;
   sending a decryption cryptographic key, by the blockchain platform, to the processing subsystem to verify the one or more crypto sealed artifacts, wherein the decryption cryptographic key is generated by the blockchain platform and stored in the blockchain platform; and
   verifying, by the processing subsystem, the one or more crypto sealed artifacts based on the decryption cryptographic key received from the blockchain platform.

7. The method as claimed in claim 6, wherein receiving and storing one or more artifacts comprises:
   developing, by a development unit, the one or more artifacts;
   storing, by the development unit, one or more developed artifacts in a version control unit; and
   transmitting, by the development unit, one or more stored artifacts to the memory.

8. The method as claimed in claim 6, further comprises deploying, by the processing subsystem, one or more verified artifacts to a production unit.

* * * * *